United States Patent Office 3,437,636
Patented Apr. 8, 1969

3,437,636
CROSSLINKABLE POLYAMIDE-ACIDS AND POLYIMIDES AND CROSSLINKED POLYMERIC PRODUCTS MADE THEREFROM
Rudolph J. Angelo, Graylyn Crest, Wilmington, Del., assignor to E. I. du Pont de Nemours and Company, Wilmington, Del., a corporation of Delaware
No Drawing. Filed May 2, 1966, Ser. No. 546,552
Int. Cl. C08g 20/32
U.S. Cl. 260—47      6 Claims

ABSTRACT OF THE DISCLOSURE

Crosslinkable linear polyamide-acids and linear polyimides containing functional hydroxyl groups, and the crosslinked reaction products of those polymers and a compound such as a diisocyanate, particularly useful as adhesives.

---

This invention relates to crosslinked polymers and to their crosslinkable polymeric precursors.

This invention provides novel linear polyamide-acids and linear polyimides having available functional hydroxyl groups. The invention also provides novel crosslinked polymer products formed by reaction of such polyamide-acids and polyimides with materials of the class comprising diisocyanates, dicarboxylic acids, dicarboxylic acid diesters, dicarboxylic acid diacid chlorides, dicarboxylic acid anhydrides, tricarboxylic acid monoanhydrides, tetracarboxylic acid dianhydrides, bis(chlorocarbonates), ortho formate esters, titanium esters, tetraalkyl o-silicates, epoxides and dialdehydes.

The presence of the free hydroxyl groups in the polyamide-acids and polyimides of this invention makes them particularly useful as adhesives and as chemical precursors readily suitable for conversion to crosslinked polymeric materials or for reaction with other agents to provide a large number of other materials, e.g., salts, esters, urethane, ethers, etc. With the presence of the functional hydroxyl group, the adhesive, cohesive, rheological and solution properties of the polyamide-acids and polyimides can be altered by crosslinking or other reactions to meet specific needs without substantial loss of the desirable mechanical, electrical, thermal and other qualities of the polyamide-acids and polyimides. For example, the crosslinked product adds desired rigidity to finished products in such applications as adhesives, coatings, etc.

The novel polyamide-acid and polyimide polymers of this invention are those consisting essentially of at least one of the following recurring structural units:

(1)
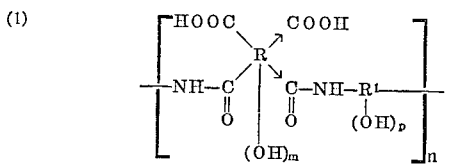

and (2)
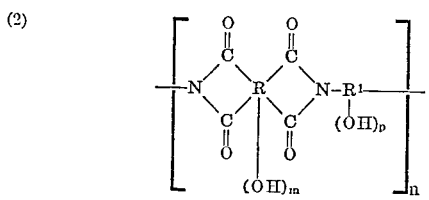

where the arrows denote isomerism;
R is a radical selected from the group consisting of

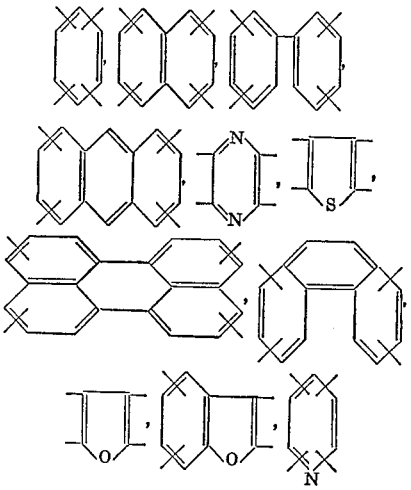

and

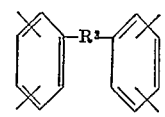

where $R^2$ is selected from the group consisting of an alkylene chain having 1–3 carbon atoms, $$-O-,\ -S-,\ -SO_2-,\ -\overset{O}{\underset{\|}{C}}-,\ -\overset{O}{\underset{\|}{C}}-O-,\ -\underset{R^3}{\overset{}{N}}-$$

$$-\underset{R^4}{\overset{R^3}{Si}}-,\ -O-\underset{R^4}{\overset{R^3}{Si}}-O-,\ -\underset{O}{\overset{R^3}{P}}-\ \text{and}\ -O-\underset{O}{\overset{R^3}{P}}-O-$$

where $R^3$ and $R^4$ are selected from the group consisting of alkyl and aryl and substituted groups thereof;
$R^1$ is a radical selected from the group consisting of

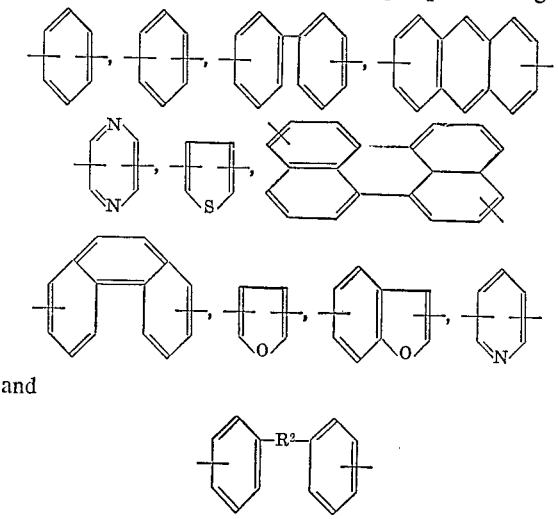

and

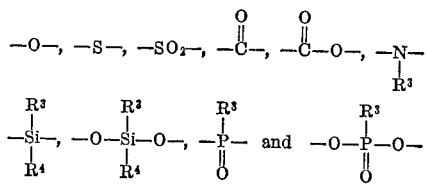

where $R^2$ has the same meaning as above;
$m$ and $p$ are positive integers selected from the group consisting of 0, 1 and 2;
the sum of $m$ plus $p$ is sufficient to provide at least one such —OH group indicated by $m$ and $p$ per each thirty of said recurring structural units;
and $n$ is a number sufficient that said polymer has an inherent viscosity of at least 0.1 as measured at 30° C.

on a 0.5% by weight solution in concentrated sulfuric acid.

Thus it will be understood that the polymers defined above can be from 0 to 100% polyamide-acid units of Formula 1 above and from 100% to 0 polyimide units of Formula 2 above.

In other words, the polymers of this invention are aromatic polyamide-acids and polyimides containing free hydroxyl groups in at least a portion of the aromatic carboxylic acid units or a portion of the aromatic diamine units, preferably the latter. The hydroxyl groups can be either alcoholic or phenolic.

The above polymers can be prepared by condensation polymerization procedures known in the art and described for example in Edwards U.S. Patent No. 3,179,614; Endrey U.S. Patent No. 3,179,630; Endrey U.S. Patent No. 3,179,633; and Edwards U.S. Patent No. 3,179,634; all issued Apr. 20, 1965.

Using the techniques described in the patents just mentioned, one or more aromatic tetracarboxylic acid dianhydrides are reacted with one or more aromatic diamines of structures such as to obtain the above defined polyamide-acid which is then converted to polyimide by thermal or chemical means or both, as described in those patents. It is only necessary that the starting materials be hydroxyl substituents to an extent sufficient to meet the requirement that the resulting polyamide-acid or polyimide have at least one free hydroxyl group per each 30 of the indicated recurring structural units. Thus, the starting materials can be (a) a hydroxyl-substituted aromatic diamine and an aromatic tetracarboxylic acid dianhydride, or (b) an aromatic diamine and a hydroxyl-substituted aromatic tetracarboxylic acid dianhydride, or (c) a hydroxyl-substituted aromatic diamine and a hydroxyl-substituted tetracarboxylic acid dianhydride, or any of the (a), (b) and (c) combinations together with any other number of such diamines and/or tetracarboxylic acid dianhydrides, with or without one or more free-hydroxyl substituents.

When one of the reactants is a hydroxyl substituted aromatic diamine, the amino groups and hydroxyl group are bonded directly to a benzenoid ring, and may be bonded to any benzenoid ring when two or more are present; and the amino groups are situated in positions other than ortho relative to each other.

Representative hydroxyl-substituted diamines are 1,3-diaminopropanol-2; 5-hydroxy - 1,3 - phenylenediamine; 4-hydroxy - 1,3 - phenylenediamine; 3,3'-dihydroxybenzidine; 4,8 - diamino - 1 - naphthol; 4,8-diamino-2-naphthol; 1,6-diamino - 3 - hydroxyhexane; 1,3-diamino-5-hydroxycyclohexane; and 1,4-diamino-2-(2-hydroxyethyl)hexane.

Representative hydroxyl-substituted dianhydrides are 3-hydroxypyromellitic dianhydride and 3,6-dihydroxypyromellitic dianhydride.

An outstanding advantage of some of the novel hydroxyl-substituted polyamide-acids of this invention is their ability to form water-soluble salts with organic bases, thus providing an aqueous route to shaped structures of polyimides. This advantage is important and is exemplified by the following:

The addition of water to an N,N-dimethylacetamide (DMAC) solution of polyamide-acid carrying hydroxyl groups resulted in the precipitation of a water-insoluble polyamic-acid. However, when triethylamine was added to a phenolic polyamic-acid dissolved in DMAC, the resulting gelled reaction product (triethyl ammonium salt) was readily redissolved by the addition of an equal volume of water. Isolation of the triethyl ammonium salt from the original DMAC reaction mixture yielded a product which was very highly swollen by water but was not water-soluble. If a trace of triethylamine was added, the polymer readily redissolved. A solution (20% by weight) of the triethyl ammonium salt of the phenolic polyamic-acid was prepared in water by the further addition of several drops of triethylamine. A clear, flexible film was obtained by solvent casting; the IR spectrum was consistent with the triethyl ammonium salt structure. Thermal conversion of this film (vac./300° C./0.5 hour/nitrogen bleed) yielded a yellow, flexible polyimide film whose imide structure was identified by IR examination. This demonstrates an aromatic polyimide film fabricated via an aqueous casting process.

Besides the polyamide-acid route, the polyimides of this invention can also be prepared by the use of hydroxyl-substituted polyimide precursors other than polyamide-acids, such as polyisoimides according to procedures described in Angelo U.S. patent application Ser. No. 325,479 filed Nov. 21, 1963, now U.S. Patent 3,282,898; polyamide-esters according to procedures described in Angelo U.S. patent application Ser. No. 311,307 filed Sept. 25, 1963, now U.S. Patent 3,316,211, Angelo U.S. patent application Ser. No. 311,326 filed Sept. 25, 1963, now U.S. Patent 3,282,897, Sorenson U.S. patent application Ser. No. 288,535 filed June 17, 1963, now U.S. Patent 3,312,663, Tatum U.S. patent application Ser. No. 325,497, filed Nov. 21, 1963, now U.S. Patent 3,261,811, and Tocker U.S. patent application Ser. No. 332,889 filed Dec. 23, 1963, now U.S. Patent 3,326,851; and polyamides according to procedures described in Angelo & Tatum U.S. patent application Ser. No. 325,442 filed Nov. 21, 1963, now U.S. Patent 3,316,212; all assigned to the same assignee as that of the present application.

Films of novel hydroxyl-substituted polyimides within this invention have been noted to have extremely high tensile moduli. For example, an unstretched film of the thermally converted polyimide from 3,3'-dihydroxybenzidine and pyromellitic dianhydride had an initial modulus of 2 million pounds per square inch.

Additionally, the hydroxyl-substituted polymers of this invention are useful as heat-sealable coatings, self-supporting adhesive films, impregnants for fiber paper, cloth and glass fabrics, as well as coatings and other structures capable of crosslinking (curing) and other post-reactions, such as acylation, etc., of the hydroxyl groups such as is useful to form desired chemical side groups on the molecules, including sites for dyeing (particularly thermochromic dyes), ion exchange functions, etc.

As mentioned above, the novel crosslinked polymer products of this invention are prepared by reaction of the above hydroxyl-substituted polyamide-acids and polyimides with one or more materials selected from the class which includes diisocyanates, diisothiocyanates, dicarboxylic acids, dicarboxylic acid diesters, dicarboxylic acid diacid chlorides, dicarboxylic acid anhydrides, tricarboxylic acid monoanhydrides, tetracarboxylic acid dianhydrides, bis(chlorocarbonates), ortho formate esters, titanium esters, tetraalkyl o-silicates, diepoxides, triepoxides and dialdehydes.

Representative diisocyanates and diisothiocyanates are: polymethylene diisocyanates and diisothiocyanates such as ethylene diisocyanate, trimethylene diisocyanate, tetramethylene diisocyanate, pentamethylene diisocyanate, etc.; the corresponding diisothiocyanates; alkylene diisocyanates and diisothiocyanates such as propylene-1,2-diisocyanate, butylene-1,2-diisocyanate, butylene-1,3-diisocyanate, butylene-2,3-diisocyanate, and butylene-1,3-diisothiocyanate; alkylidine diisocyanates and diisothiocyanates such as ethylidene diisocyanate ($CH_3CH(NCO)_2$), butylidene diisocyanate ($CH_3CH_2CH_2CH(NCO)_2$) and heptylidene diisothiocyanate ($CH_3(CH_2)_5CH(CNS)_2$); cycloalkylene diisocyanates and diisothiocyanates such as cyclopentylene-1,3-diisocyanate, cyclohexylene - 1,2 - diisocyanate, cyclohexylene-1,4-diisocyanate, and cyclohexylene-1,2-diisothiocyanate; aromatic diisocyanates and diisothiocyanates such as m-phenylene diisocyanate, p-phenylene diisocyanate, 1-methylphenylene-2,4-diisocyanate, naphthylene-1,4-diisocyanates, o,o'-tolane diisocyanate, diphenyl-4,4'-diisothiocyanate, m-phenylene diisothiocyanate, p-phenylene diisothiocyanate; aliphatic-aromatic diisocyanates or diisothiocyanates such as p-xylyene diisocyanate, m-xylylene diisocyanate, 4,4'-diphenylenemethane diisocyanate, 4,4'-diphenylenepropane diisocyanate, or p-xylylene diisocyanate and diisocyanates and diisothiocyanates containing hetero-atoms such as $SCNCH_2OCH_2NCS$, $SCNCH_2CH_2OCH_2CH_2NCS$ and
$$SCN(CH_2)_3—S—(CH_2)_3NCS$$

Examples of operable dicarboxylic acids are succinic, glutaric, adipic, pimelic, suberic, azelaic, sebacic, 1,12-dodecanedoic, hexadecamethylene dicarboxylic, phthalic, terephthalic, isophthalic, naphthalene - 1,4 - dicarboxylic acids, etc. The diacid halides (e.g., chlorides and bromides), and the mono- and di(lower alkyl) esters are also operable. Examples of acid anhydrides are succinic anhydride; methyl succinic anhydride; glutaric anhydride; phthalic anhydride; trimellitic anhydride; pyromellitic anhydride; 2,3,6,7-naphthalenetetracarboxylic dianhydride; 3,3',4,4' - diphenyltetracarboxylic dianhydride; 1,2,5,6-naphthalenetetracarboxylic dianhydride; 1,2,3,4-cyclopentanetetracarboxylic dianhydride; 2,2',3,3'-diphenyltetracarboxylic dianhydride; 2,2-bis(3,4-dicarboxyphenyl)propane dianhydride; 3,4-dicarboxyphenyl sulfone dianhydride; 2,3,4,5 - pyrrolidinetetracarboxylic dianhydride; 3,4,9,10-perylenetetracarboxylic dianhydride; bis(3,4-dicarboxyphenyl) ether dianhydride; and ethylenetetracarboxylic dianhydride.

Examples of bis(chlorocarbonates) are ethylene bis (chlorocarbonate) and cyclohexylene-1,4-bis(chlorocarbonate). Examples of orthoformate esters are ethyl orthoformate and butyl orthoformate.

The titanium and silicon esters are exemplified by tetraisopropyl titanate, tetrabutyl titanate, tetramethyl orthosilicate and tetraethyl orthosilicate.

Examples of epoxides are butadiene diepoxide, vinylcyclohexene diepoxide, p-divinylbenzene diepoxide, m-divinylbenzene diepoxide, isoprene diepoxide, cyclopentadiene diepoxide, cyclooctadiene diepoxide, diallyl adipate diepoxide, diallyl maleate triepoxide, 2,2-diallyloxypropane diepoxide, diallyl phthalate diepoxide, diallyl terephthalate diepoxide and triallylamine triepoxide.

Examples of dialdehydes are succinaldehyde, adipaldehyde, and terephthalaldehyde.

It will be seen that the use of the foregoing crosslinking agents provides crosslinked polymers wherein the crosslinks are of diurethane, diester, or diether, etc., type bonds, with the crosslinking bridge replacing 2, 3 or 4 hydrogens of the available hydroxyl groups in the polymer. It will also be seen that the majority of bridge groups will have at least 2 and not more than about 20 carbon atoms, and can be aliphatic, alicyclic, aromatic, heterocyclic, mixed aliphatic-aromatic, etc. Preferably, the bridge nucleus (ignoring indicated valences) is of the same groups as shown for R above.

The amount of crosslinking will depend on such factors as the incidence of available hydroxyl sites, and the amount of crosslinking agent or agents used, both factors being determined by the nature of the effect desired. It will be convenient to use an amount of crosslinking material substantially equivalent on a molar functional group basis to the amount of free hydroxyl groups in the polymer.

The reaction which effects the desired crosslinking can be carried out using conventional techniques, illustrated below. The crosslinking agent can be incorporated in the polymer before or after the polymer is shaped, and before or after the polyamide-acid is converted partly or all to polyimide. Preferably, prior to conversion of the polyamide-acids of this invention into the polyimides, the solvent-soluble polyamide-acid will be coated onto any of various substrates, or formed into the desired shape such as a film, fiber, tube, etc. The substrates can be metals, inorganic materials such as glass, mica and asbestos, or organic polymers. Representative metals are copper, aluminum and steel. Glass and the organic polymers can be in the form of sheets, films, woven or nonwoven fabrics, etc.

The crosslinking of this invention is particularly useful in the adhesives industry, in which polyimides are finding their way, to permit application of high solids solutions of a workable viscosity which will readily wet the surfaces which are to be bonded together. By means of crosslinking, the adhesive becomes insoluble and less fusible at the temperature at which the bond is made. As a result the bond retains good strength but is no longer solvent-sensitive or fusible at functional temperatures.

The invention will be further understood by reference to the following illustrative examples in which parts and percentages are by weight unless otherwise indicated.

EXAMPLE 1

A suspension of 9.00 grams (0.1 mole) of 1,3-diaminopropanol-2 were stirred under nitrogen with 175 grams of N,N-dimethylacetamide (DMAC) (freshly distilled and dried). After some of it had gone into solution, 21.80 grams (0.1 mole) of sublimed pyromellitic dianhydride (PMDA) was added in portions with stirring. The stirring was continued for 3 hours whereupon the mass changed into a yellow-brown viscous solution of the desired polyamide-acid. On casting it on glass plates and drying at 135° C., clear, light-colored films were obtained. The inherent viscosity measured on a portion of the solution (after dilution to 0.5% by weight) was 0.32. Both film and solution were useful as adhesives in metal and other lap joints as demonstrated by the following. The polymer solution was painted on one end of aluminum or steel strips, heated in an oven to slight tackiness, then two of the strips, coated to coated side, were pressed together at temperatures between 250° and 350° C. for 3 minutes at 50–100 pounds per square inch. The aluminum strips adhered tightly to each other under these conditions. Similar joints were made using a self-supporting film put between the two metal strips and pressed under the same conditions. The metal strips adhered tightly in all these cases. The adhesion of this polyimide was measured in terms of tensile shear strength of the metal lap joints. Thus, aluminum joints had shear strengths of 90, 530, and 250 pounds per square inch for the joints prepared at 250°, 300°, and 350° C., respectively. Lap joints on stainless steel strips had tensile shear strengths of 80 pounds per square inch when prepared at 250° C.

EXAMPLE 2

Using the procedure of Example 1, 0.90 gram (0.01 mole) of 1,3-diaminopropanol-2, 11.06 grams (0.07 mole) of 1,9-diaminononane and 4.00 grams (0.02 mole) of 4,4'-diaminodiphenyl ether were dissolved in 214 grams of DMAC and reacted with 21.80 grams (0.1 mole) of pyromellitic dianhydride. After two hours reaction time the resulting polyamide-acid polymer had reached an inherent viscosity of 0.76, determined as in Example 1. Metal lap joints were prepared as in Example 1 and the following tensile shear strengths were measured: 540, 520, 275 pounds per square inch for aluminum joints prepared at 250°, 300°, and 350° C., respectively. Stainless steel lap joints had a shear strength of 645 pounds per square inch when prepared at 300° C. The adhesive character of this copolymer was also demonstrated by preparing a coating of this copolymer on a film of the polypyromellitimide of bis(4-aminophenyl) ether. Thus, a heat sealable polyimide film was made. These coated films were heat sealed in a laboratory press at 350° C. for 30 seconds at 150 pounds per square inch. The peel strengths measured on these heat seals were, in grams per inch, 2245, 1460, 579 and 175 pounds per square inch after 0, 24, 100, and 500 hours at 250° C. in air.

EXAMPLE 3

Using the procedure of Example 1, a polymer was prepared from 0.90 gram (0.01 mole) of 1,3-diaminopropanol-2, 9.48 grams (0.06 mole) of 1,9-diaminononane, 1.52 grams (0.01 mole) of 3,5-diaminobenzoic acid and 4.00 grams (0.02 mole) of 4,4'-diaminodiphenyl ether. These diamines were reacted in 212 grams of DMAC with 21.80 grams (0.1 mole) of pyromellitic dianhydride. The mixture was stirred for 2¼ hours. Inherent viscosity of the polymer measured as a 0.5% solution in DMAC was 0.43. Metal lap joints prepared from this solution, using the procedure of Example 1, had the following tensile shear strengths: 650, 735, 1055 pounds per square inch for aluminum joints prepared at 250°, 300°, and 350° C., respectively. Stainless steel lap joints had shear strengths of 980 and 450 pounds per square inch for those prepared at 300° and 350° C., respectively.

EXAMPLE 4

Using the procedure of Example 1, 0.90 gram (0.01 mole) of 1,3-diaminopropanol-2, 6.32 grams (0.04 mole) of 1,9-diaminononane and 6.80 grams (0.05 mole) of m-xylylenediamine were reacted in 202 grams of DMAC with 21.80 grams (0.10 mole) of pyromellitic diahydride. Salt formation, which occurred in some cases with the previous examples, was much more abundant, but the salt was broken up by vigorous stirring for about 15 minutes. The reaction was run at room temperature for 4.5 hours and the polymer from this solution showed an inherent viscosity of 0.48 (measured at 0.5% concentration). Adhesive properties were demonstrated by casting a film on a glass plate and drying at 100° C. for 15 minutes. A clear, colorless film tightly adhering to the glass was obtained. Metal lap joints were made again as in Example 1 and the following shear strengths were obtained: In aluminum joints, 870, 1250 and 505 pounds per square inch for the joints prepared at 250°, 300°, and 350° C., respectively; and 670 and 490 pounds per square inch for the stainless steel lap joints prepared at 250° and 300° C., respectively.

EXAMPLE 5

Using the procedure of Example 1, 5.00 grams (0.025 mole) of 4,4'-diaminodiphenyl ether, 5.00 grams (0.025 mole) of 2,4-diaminodiphenyl ether, 6.32 grams (0.04 mole) of 1,9-diaminononane, 0.45 gram (0.005 mole) of 1,3-diaminopropanol-2 and 0.76 gram (0.005 mole) of 3,5-diaminobenzoic acid were reacted with 21.80 grams (0.1 mole) of pyromellitic dianhydride in 223 grams of DMAC. After a little more than half of the PMDA was added, a gummy precipitate formed which after further stirring for a total of 23 hours dissolved with the rest of the PMDA. The polymer had an inherent viscosity of 0.81 (measured at 0.5% concentration). Films could be prepared from this solution by casting on glass plates as in previous examples, or by pressing at 300°/30 pounds per square inch/1 minute the polymer powder obtained upon precipitating the solution in ethyl acetate and drying one hour at 75° C. in nitrogen. The film was tough, yellow and contained some residual DMAC solvent. The infrared spectrum of the pressed film showed the typical characteristics of polyimide. Utility as an adhesive was again demonstrated in lap joints, with aluminum strips showing lap shear strengths of 650, 960 and 940 pounds per square inch for the joints prepared at 250°, 300°, and 350° C., respectively, and with stainless steel joints showing lap shear strengths of 630, 680 and 1045 pounds per square inch for the joints prepared at 250°, 300°, and 350° C., respectively.

EXAMPLE 6

Using the procedure of Example 1, 2.72 grams (0.02 mole) of m-xylene diamine, 2.00 grams (0.01 mole) of 4,4'-diaminodiphenyl ether and 0.90 gram (0.01 mole) of 1,3-diaminopropanol-2 were reacted in 105 grams of DMAC with 4.36 grams (0.02 mole) of pyromellitic dianhydride and 8.36 grams (0.026 mole) of benzophenone tetracarboxylic dianhydride. Salt formation occured again after about ⅔ of the mixed dianhydrides had been added to the diamine solution. The precipitate was broken up by vigorous stirring and addition of the rest of the dianhydrides. After a total of 1.5 hours stirring, the solution became viscous and the inherent viscosity of the polymer was 0.42 as measured on an aliquot diluted to 0.5%. The polyimide prepared by thermal conversion of this polyamide-acid solution softened at about 310° C. with decomposition. Lap joints prepared with the polyamide acid had the folowing tensile shear strengths: aluminum, 210 and 180 pounds per square inch when made at 250° and 300° C., respectively; and stainless steel, 1260 pounds per square inch when made at 300° C.

EXAMPLE 7

Using the procedure of Example 1, but operating with ice cooling of the reaction vessel, 5.40 grams (0.025 mole) of 3,3'-dihydroxybenzidine in 62 grams of DMAC were reacted with 5.45 grams (0.025 mole) of pyromellitic dianhydride which was slowly added over a period of 10 minutes to the solution of diamine kept between 5 and 10° C. After another 10 minutes, the cooling bath was removed and the reaction proceeded at room temperature. After 45 minutes the solution gelled. The concentration was lowered to 7.5% solids (from the original 15%) by adding more DMAC. After further stirring and standing, the gel disappeared and the inherent viscosity was 2.25. Films were cast from the solution by spreading on a glass plate and drying in an air oven at 135° C. for 10 minutes. Infrared spectra indicated presence of polyamide-acid film.

EXAMPLE 8

A 5% solids solution was prepared with the procedure of Example 7, using the same ingredients, except 206 grams of DMAC instead of 62 grams. Reaction temperature was kept between 2 and 3° C. PMDA was added over a period of 25 minutes. Viscosity increased steadily over the period of stirring (4.5 hours) at low temperature. The inherent viscosity of the solution was 1.97 (0.5% concentration). Thin films were cast as before and thermally converted to polyimide film. The inherent viscosity of the resulting polyimide film (measured on a 0.5% solution in $H_2SO_4$ at 30°) was 0.44. The thermally converted films had the physical properties listed in the following tabulation, among which the most outstanding one is the tensile modulus of almost two million pounds per square inch.

| Property | Temperature | |
|---|---|---|
| | 23° C. | 200° C |
| Modulus (pounds per square inch) | 1,800,000 | 795,000 |
| Elongation (percent) | 0.5 | 0.9 |
| Tensile strength (pounds per square inch) | 11,200 | 6,700 |
| Volume resistivity | $10^{14}$ | $10^{13}$ |
| Dissipation factor | 0.01 | 0.01–0.04 |
| Dielectric constant | 5.8 | 5.0 |
| Density (g./cm.) | 1.504 | |
| Zero strength temperature (° C.) | 796±25 | |
| Thermal breakdown (thermogravimetry): | | |
| 1st (° C.) | 450–500 | |
| 2nd (° C.) | 600–700 | |
| X-ray diffraction pattern | Crystalline | |

Polyamide-acid films as described in Example 8 were immersed in a bath of cyclohexane/acetic anhydride/pyridine (500/100/100 parts by weight) for a period of 86 hours at room temperature. After washing with benzene, putting on frames and vacuum drying overnight at 100° C. in a nitrogen atmosphere, the acetylated polyimide film was obtained. The inherent viscosity measured on a 0.5% solution in sulfuric acid at 30° C. was 0.44. The physical properties of this film were as follows:

| Property | Temperature | |
|---|---|---|
| | 23° C. | 200° C. |
| Modulus (pounds per square inch) | 990,000 | 415,000 |
| Elongation (percent) | 2.7 | 4.4 |
| Tensile strength (pounds per square inch) | 21,400 | 5,500 |
| Volume resistivity | $10^{15}$ | $10^{13}$ |
| Dissipation factor | 0.006–0.02 | 0.005–0.01 |
| Dielectric constant | 4.8 | 3.9 |
| Density | 1.366 | |
| Zero strength temperature (° C.) | 798±25 | |
| Thermal breakdown (thermogravimetry) (° C.) | 300–500 | |
| X-ray diffraction pattern | Amorphous | |

EXAMPLE 9

About 5 milliliters of a 5% by weight DMAC solution of the polyamide-acid as described in Example 8 was treated with 5 drops of triethylamine. Immediate gelation occurred. Upon addition of water the gel dissolved to a clear solution.

The triethylammonium salt of the polyamide-acid as described in the previous paragraph was isolated and dried. About 2 grams of this salt was dissolved in about 10 grams of water containing 2–3 drops of triethylamine. After stirring, a viscous dope was obtained; from it films were cast on glass plates and dried at 100° for 5 to 10 minutes. The IR spectrum showed the characteristics of a polyamide-acid salt. After heating this film to 300° in vacuo with a nitrogen bleed-in for 30 minutes, a clear flexible yellow film was obtained whose IR spectrum was consistent with the structure of a polyimide with pendant phenolic groups. To further demonstrate utility, glass cloth impregnates were prepared from some of these compositions.

EXAMPLE 10

This example illustrates crosslinking via ester linkages. When a 5% solids solution of the polyamide-acid, as described in Example 8, containing free phenolic groups, was treated with adipyl chloride, the color changed to a red-brown and the solution gelled immediately to a tough, jello-like material. When, however, acetyl chloride, a monoacylchloride and non-crosslinking reagent, was used instead of adipyl chloride, in spite of the color change to reddish-brown, no gelation occurred even after several hours standing. Gelation is indicative of crosslinking.

EXAMPLE 11

This example illustrates crosslinking via urethane links. To a 5% solids solution of a polyamide-acid containing phenolic hydroxyl groups (as described in Example 8) were added an equal volume (5 milliliters) of a 2% solution of 4,4′-diisocyanatodiphenylmethane in DMAC and 2 drops of triethylamine catalyst. Immediate gelation occurred and the consistency became lumpy and curdy. On stirring with water for an extended time, no solution occurred, thus indicating crosslinking via urethane crosslinks. When, on the other hand, triethylamine was added alone to the solution of the polyamide-acid (without the diisocyanate), a gel was formed but it was easily water soluble, thus indicating mere salt formation. To demonstrate utility, glass cloth impregnates were made using several of above compositions.

The foregoing examples can be repeated, as will be readily understood by persons skilled in this art, by substituting other materials within the indicated scope of this invention for those of the specific exemplifications.

It is to be understood that the foregoing detailed description is given merely by way of illustration and that many variations may be made therein without departing from the spirit or scope of this invention.

The invention claimed is:
1. The polyamide-acid polymer consisting essentially of the recurring structural unit

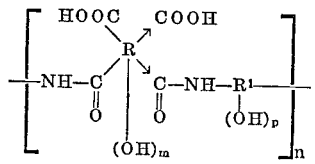

where the arrows denote isomerism;
R is a radical selected from the group consisting of

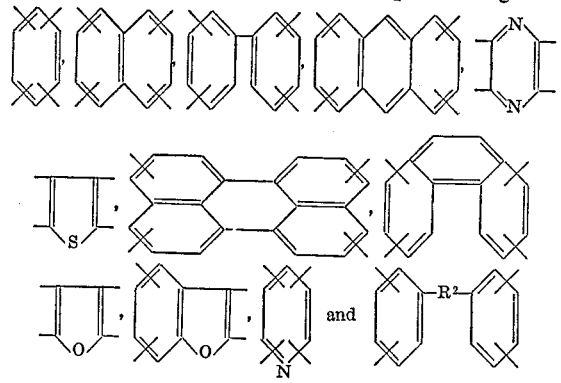

where $R^2$ is selected from the group consisting of an alkylene chain having 1–3 carbon atoms,

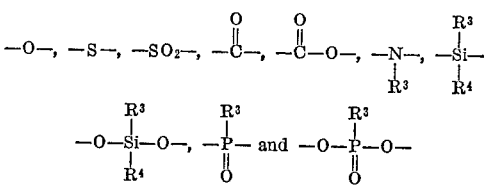

where $R^3$ and $R^4$ are selected from the group consisting of alkyl and aryl and substituted groups thereof;
$R^1$ is a radical selected from the group consisting of

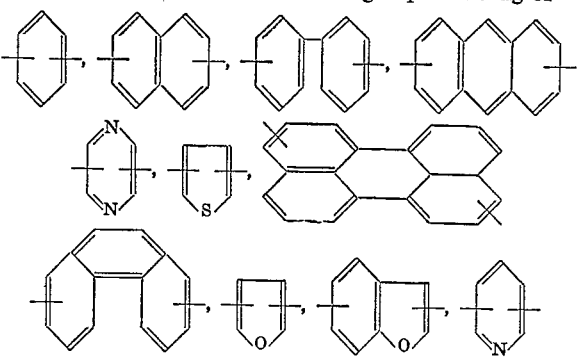

and

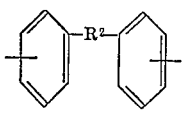

where $R^2$ has the same meaning as above;

$m$ and $p$ are positive integers selected from the group consisting of 0, 1 and 2;

the sum of $m$ plus $p$ is sufficient to provide at least one such —OH group indicated by $m$ and $p$ per each thirty of said recurring structural units;

and $n$ is a number sufficient that said polymer has an inherent viscosity of at least 0.1 as measured at 30° C. on a 0.5% by weight solution is concentrated sulfuric acid.

2. The polyimide polymer consisting essentially of the recurring structural unit

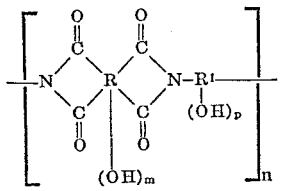

where R is a radical selected from the group consisting of

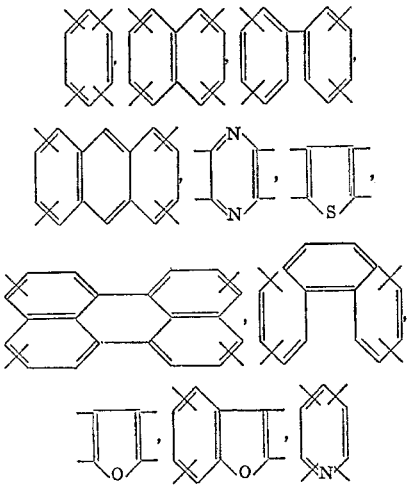

and

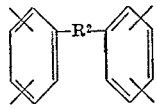

where $R^2$ is selected from the group consisting of an alkylene chain having 1–3 carbon atoms,

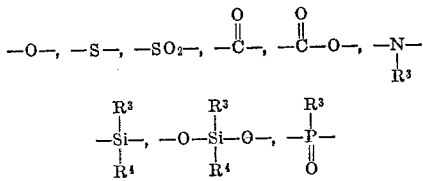

and

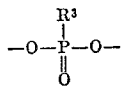

where $R^3$ and $R^4$ are selected from the group consisting of alkyl and aryl and substituted groups thereof;

$R^1$ is a radical selected from the group consisting of

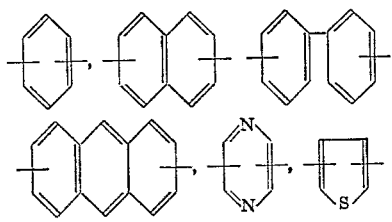

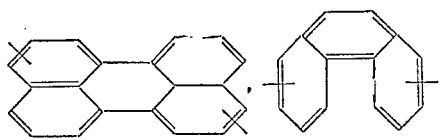

and

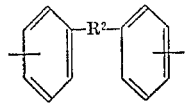

where $R^2$ has the same meaning as above;

$m$ and $p$ are positive integers selected from the group consisting of 0, 1 and 2;

the sum of $m$ plus $p$ is sufficient to provide at least one such —OH group indicated by $m$ and $p$ per each thirty of said recurring structural units;

and $n$ is a number sufficient that said polymer has an inherent viscosity of at least 0.1 as measured at 30° C. on a 0.5% by weight solution in concentrated sulfuric acid.

3. The crosslinked polyamide-acid polymer comprising the reaction product of a polymer according to claim 1 and at least one compound selected from the class consisting of diisocyanates, diisothiocyanates, dicarboxylic acids, dicarboxylic acid diesters, dicarboxylic acid diacid chlorides, dicarboxylic acid anhydrides, tricarboxylic acid monoanhydrides, tetracarboxylic acid dianhydrides, bis-(chlorocarbonates), ortho formate esters, titanium esters, tetraalkyl o-silicates, diepoxides, triepoxides and dialdehydes.

4. The crosslinked polyimide polymer comprising the reaction product of a polymer of claim 2 and at least one compound selected from the class consisting of diisocyanates, diisothiocyanates, dicarboxylic acids, dicarboxylic acid diesters, dicarboxylic acid diacid chlorides, dicarboxylic acid anhydrides, tricarboxylic acid monoanhydrides, tetracarboxylic acid dianhydrides, bis(chlorocarbonates), ortho formate esters, titanium esters, tetraalkyl o-silicates, diepoxides, triepoxides and dialdehydes.

5. The polymer of claim 3 wherein said compound is a diisocyanate.

6. The polymer of claim 4 wherein said compound is a diisocyanate.

References Cited

UNITED STATES PATENTS 3,306,876   2/1967   Kantor et al. _____ 260—47
3,336,258   8/1967   Angelo et al. _____ 260—47

WILLIAM H. SHORT, *Primary Examiner.*

L. L. LEE, *Assistant Examiner.*

U.S. Cl. X.R.

260—65, 67.5, 77.5, 78, 78.4, 79